United States Patent [19]
Ehreth

[11] Patent Number: 5,982,854
[45] Date of Patent: *Nov. 9, 1999

[54] FIBER OPTIC BASED SUBSCRIBER TERMINAL

[75] Inventor: David Ehreth, Santa Rosa, Calif.

[73] Assignee: Alcatel USA, Inc., Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/605,944

[22] Filed: Feb. 23, 1996

[51] Int. Cl.$^6$ .............................. H04B 10/12; H04B 1/38; H04Q 7/20

[52] U.S. Cl. ......................... 379/56.2; 455/552; 455/426

[58] Field of Search .............................. 379/56.2, 39, 37, 379/210, 212, 32, 33; 455/74.1, 414, 417, 404, 552, 462, 465, 403, 426; 359/179, 145, 118, 125, 137, 109

[56] References Cited

U.S. PATENT DOCUMENTS

| | | | |
|---|---|---|---|
| 4,367,548 | 1/1983 | Cotten, Jr. et al. | 370/3 |
| 4,441,180 | 4/1984 | Schussler | 370/3 |
| 4,989,230 | 1/1991 | Gillig et al. | 379/59 |
| 5,127,042 | 6/1992 | Gillig et al. | 379/59 |
| 5,175,639 | 12/1992 | Takasaki | 359/118 |
| 5,185,779 | 2/1993 | Dop et al. | 455/404 |
| 5,202,780 | 4/1993 | Fussganger | 359/125 |
| 5,260,988 | 11/1993 | Schellinger et al. | 379/59 |
| 5,367,558 | 11/1994 | Gillig et al. | 379/59 |
| 5,428,668 | 6/1995 | Dent et al. | 379/59 |
| 5,467,384 | 11/1995 | Skinner, Jr. | 379/66 |
| 5,493,436 | 2/1996 | Karasawa et al. | 359/145 |
| 5,526,402 | 6/1996 | Dent et al. | 455/74.1 |
| 5,603,095 | 2/1997 | Uola | 455/67.1 |
| 5,615,246 | 3/1997 | Beveridge | 379/56.2 |
| 5,664,002 | 9/1997 | Skinner, Sr. | 379/56.2 |
| 5,699,176 | 12/1997 | Cohen | 359/179 |
| 5,751,789 | 5/1998 | Farris et al. | 379/33 |
| 5,790,631 | 8/1998 | Minarczik et al. | 379/33 |

FOREIGN PATENT DOCUMENTS

| | | | |
|---|---|---|---|
| 0481954 | 4/1992 | European Pat. Off. | H04B 10/00 |
| 9417639 | 8/1994 | WIPO | H04Q 7/04 |

OTHER PUBLICATIONS

PCT Written Opinion, dated Apr. 1, 1998.

PCT Search Report, PCT/US/97/02710, Jul. 15, 1997.

Article; E. Drucker, P. Estabrook, D. Pinck, L. Ekroot, "Integration of Mobile Satellite and Cellular Systems," pp. 119–124.

Larry Campbell, "Multiterminal Fiber Systems", *Laser Focus*, Jun. 1978, pp. 42–45.

John Fox, "The Fibrevision Trial at Milton Keynes", *IFOC*, Nov./Dec. 1982, pp. 7–14.

*Primary Examiner*—Dwayne D. Bost
*Assistant Examiner*—Tracy M. Legree
*Attorney, Agent, or Firm*—Baker & Botts, L.L.P.

[57] ABSTRACT

A subscriber terminal (22) within a business/residence (32) is in communications with a telecommunications network (12) through a fiber optic connection (33) to an optical network unit (20). Telephony signals are transmitted to and from the subscriber terminal to a user through a cordless telephone handset (26). During normal operation, the cordless telephone handset (26) operates in a cordless mode, passing telephony signals to a subscriber terminal telephone antenna (24) for transmission on the fiber optic connection (33). In the event of a power outage at the business/residence (32), the cordless telephone handset (26) switches to a wireless mode in order to continue to provide telephony communications. In the wireless mode, telephony communications are provided from the cordless telephone handset (26) to the telecommunications network (12) through a wireless telephone provider (14).

17 Claims, 3 Drawing Sheets

FIBER OPTIC BASED SUBSCRIBER TERMINAL

TECHNICAL FIELD OF THE INVENTION

This invention relates generally to the field of telecommunications systems and more particularly to a fiber optic based subscriber terminal.

BACKGROUND OF THE INVENTION

As the Information Age moves forward and businesses and individuals increasingly demand and depend on the immediate availability of current information, the reliability of telecommunications systems to deliver this information becomes critical. Homes and businesses use telecommunications systems to exchange such information as video, audio, data, telephony, and computer/control information. Reliability of telecommunications systems becomes of paramount importance as society relies more and more on telecommunications systems.

Telecommunications systems using fiber optic cable or copper based high speed digital drop techniques to transmit telecommunications signals are becoming increasingly prevalent due to the enormous advantages that fiber-optic technology provides over conventional analog copper-wire based systems. Some of these advantages include larger bandwidths and improved signal quality. A larger bandwidth allows for the transmission of larger amounts of information over a shorter period of time. These and other advantages have made fiber-optic cables the preferred technology for exchanging information in telecommunications systems.

Fiber optic technology does suffer at least one disadvantage as compared to telecommunications systems using conventional copper-wire or wire based local loop distribution systems. In the event of an electrical power outage at the home or business, a fiber-optic based local loop distribution system suffers a complete loss of telephony communications unlike a copper-wire based local loop distribution system that receives power directly from the central office and is able to provide telephony communications despite a power outage at the home or business. Even though the power outage prevents the operation of televisions, video monitors, and computers, the telephone continues to operate normally in a copper-wire based system. The telephony communications continue normally due to the local phone company providing power to the system through the copper-wire phone line, independent of the local power company. Thus, even though video and data communications may cease due to the power outage, telephony or telephone communications may continue. This is not true in a fiber optic based system. Power cannot be supplied through a fiber-optic based local loop distribution system in the same manner. Thus, a power outage ceases telephony communications in a fiber-optic based local loop distribution system.

Telephony communications are especially critical during emergencies, especially police, fire, or medical emergencies demanding immediate attention. Unfortunately, the events surrounding emergencies often cause power outages, such as fires and earthquakes. Thus, fiber optic based local loop distribution systems suffer a significant disadvantage as compared to copper-wire based local loop systems. Therefore, it is desirable to overcome the power supply problems of a fiber optic based system.

SUMMARY OF THE INVENTION

From the foregoing it may be appreciated that a need has arisen for a fiber optic based subscriber system that may provide telephony communications during an electrical system power outage or during the loss of the fiber optic connection to the subscriber system. In accordance with the present invention, there is provided a fiber optic based subscriber terminal and method that substantially eliminate and reduce the disadvantages and problems associated with conventional subscriber terminals coupled to a telecommunications network through a fiber optic connection.

According to an embodiment of the present invention, a subscriber terminal is provided that includes an external network interface module exchanging information, such as video, telephony, and data, with a telecommunications network over a fiber optic connection. A telephony interface module exchanges telephony signals with the external network interface module and determines if a communication failure occurs through the fiber optic connection. A handset communicates telephony signals with the telephony interface module in a cordless mode during normal operation. In the event of a communication failure through the fiber optic connection, the handset is switched to a wireless mode for communicating with the telecommunications network, bypassing the telephony interface module and the external network interface module.

The present invention provides various technical advantages over conventional subscriber terminals using fiber optic based local loop distribution systems. One technical advantage includes the ability to withstand power outages and other communication interruptions without the loss of telephony communications. Another technical advantage includes the elimination of expensive power supply equipment, and associated operational costs, used to provide power to conventional copper-wire based local loop distribution systems. The present invention also provides a technical advantage over conventional wire or copper-wire based local loop distribution systems. For example, the ability to provide telephony communications in the event of the complete failure or loss of a local loop distribution system provides a technical advantage over conventional wire based local loop distribution systems. The present invention also provides the technical advantage of allowing emergency or 911 calls to be made in the event of a power outage or other loss of a local loop distribution system. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which.

DETAILED DESCRIPTION OF THE INVENTION

Figure 1:
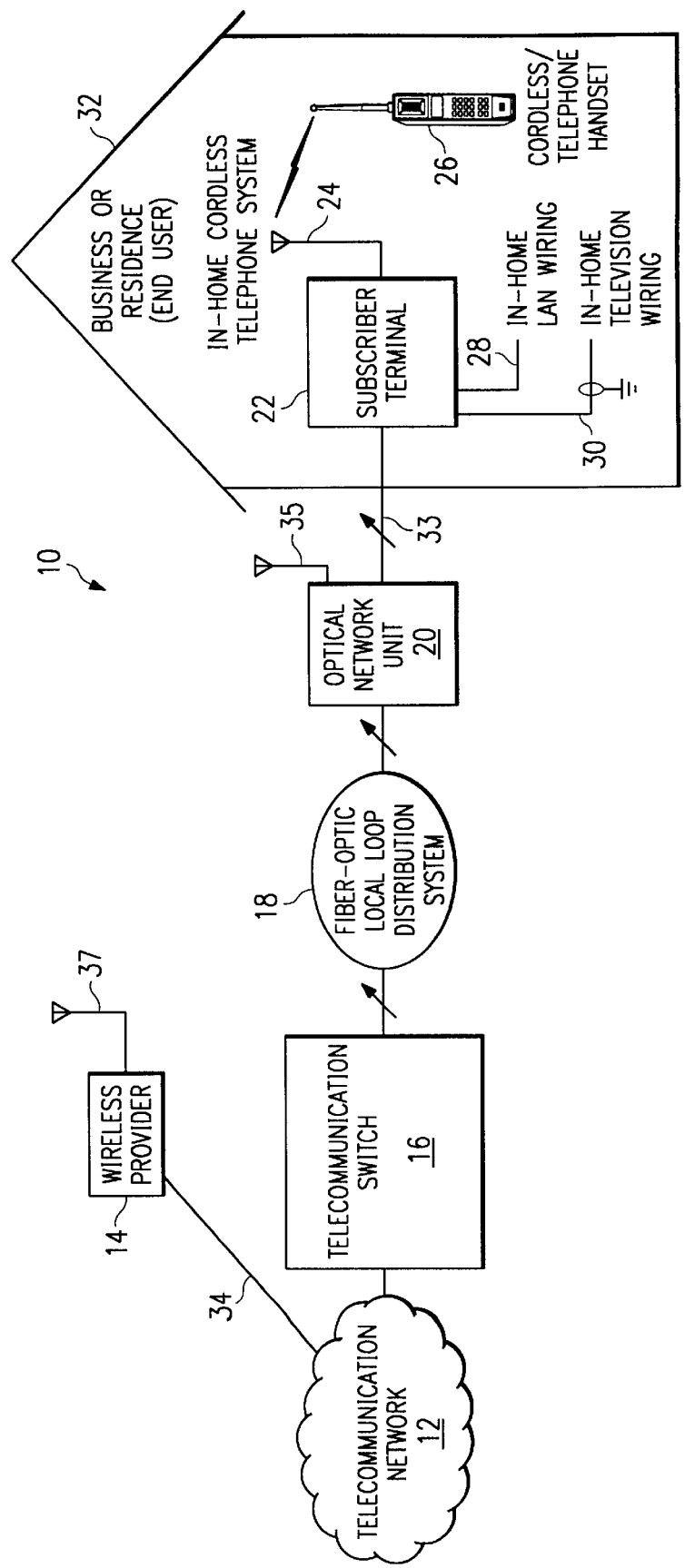
FIG. 1 is a block diagram illustrating a telecommunications system and network.

FIG. 1 is a block diagram of a telecommunications system 10. Telecommunications system 10 includes a telecommunications network 12, a wireless telephone provider 14, and a subscriber terminal 22 located within a business/residence 32, all in communication with one another. Telecommunications network 12 may be any available public or private telecommunications network. Telecommunications network 12 communicates with subscriber terminal 22 through a telecommunications switch 16, a fiber optic local loop distribution system 18, and an optical network unit 20. Optical network unit 20 couples to subscriber terminal 22 by direct connection to business/residence 32 through a fiber optic connection 33. Optical network unit 20 is an optical controller for providing optical signals to subscriber terminals of various users. These users may be from a few users to a few hundred users. Optical network unit 20 is supplied with power from the local power company but may also operate for a limited time through a backup power supply such as a battery backup.

Subscriber terminal 22 can receive and provide optical communication signals including audio, video, data, and telephony communication signals. Subscriber terminal 22 includes an in-home local area network wiring 28 and an in-home television wiring 30 so that data and video signals may be provided throughout business/residence 32.

Telecommunications network 12 communicates with wireless telephone provider 14 through any available direct or wireless communication path or link 34. Wireless telephone provider 14 may be a cellular, satellite, or personal communications system wireless interface in order to transfer wireless telecommunications. Subscriber terminal 22 communicates with wireless telephone provider 14 through a cordless telephone handset 26 that can operate as a wireless telephone so that wireless telephony communication signals may be exchanged between subscriber terminal 22 and wireless telephone provider 14.

Cordless telephone handset 26 may operate as a local cordless telephone or as a wireless telephone. When operating as a local cordless telephone, cordless telephone handset 26 exchanges telephony signals with telecommunications network 12 through subscriber terminal 22. Cordless telephone handset 26 communicates with subscriber terminal 22 through subscriber terminal telephone antenna 24. Telephony signals may then be exchanged between subscriber terminal 22 and telecommunications network 12 through optical network unit 20, fiber optic local loop distribution system 18 and telecommunications system switch 16, which interfaces with telecommunications network 12. Cordless telephone handset 26 may also communicate directly with optical network unit 20 through cordless operation with an optical network unit antenna 35.

When operating as a wireless telephone, cordless telephone handset 26 provides wireless telephony communication with wireless telephone provider 14. Such wireless communications may include cellular, satellite, or personal communications system services. Wireless telephone provider 14 includes an antenna 37 for receiving and transmitting wireless telephony signals to wireless telephone users, including cordless telephone handset 26. Wireless telephone provider 14 is in communication with telecommunications network 12 so that cordless telephone handset 26 may be in communication with any telephony device having access to telecommunications network 12.

In operation, optical communication signals including video, audio, data, and telephony communication signals are exchanged between subscriber terminal 22 and telecommunications network 12 through optical network unit 20, fiber optic local loop distribution system 18, and telecommunications switch 16. The telephony communication signals are primarily exchanged as optical signals using fiber optic cables. Wireless telephony communication is provided between wireless telephone provider 14 and a plurality of wireless telephone users. These wireless telephone users may exchange telephony signals with non-wireless telephone users through telecommunications network 12.

Subscriber terminal 22 receives the optical communication signals and routes them to an appropriate output device of business/residence 32. For example, video signals may be routed through in-home television wiring 30. In-home television wiring 30 may be coaxial cable or any other cable having a sufficient bandwidth. Computer or data signals received by subscriber terminal 22 will be supplied to in-home local area network wiring 28 which may be coupled to any of a variety of computer devices such as a personal computer. Finally, the telephony communication signals will be transmitted via subscriber terminal telephone antenna 24 to cordless telephone handset 26 operating as a local cordless phone.

When a power outage occurs at business/residence 32, the optical communication signals, including the telephony communication signals, would cease to be sent or received over fiber optic connection 33 by subscriber terminal 22. Subscriber terminal 22 requires power to operate and thus could no longer receive any signals. Backup power cannot be supplied by the central office through fiber optic cable as in copper-wire local loop distribution systems. Furthermore, the power outage prevents the televisions, video terminals, and personal computers from operating. However, cordless telephone handset 26 may be swapped from operating as a local cordless phone to operating as a wireless phone. This allows telephony communications to continue during the power outage. Thus, even though a power outage prevents most communication, telephony communications may continue between cordless telephone handset 26 and wireless telephone provider 14. The availability of telephony communication is especially critical during emergency situations.

As an alternative to the operation just described, when a power outage occurs, cordless telephone handset 26 may be in local wireless or cordless communication with optical network unit 20. Optical network unit 20 may operate from a backup power source and include circuitry to exchange local wireless or cordless telephony signals with cordless telephone handset 26. The wireless telephony communication signals exchanged between optical network unit 20 and cordless telephone handset 26 may then be exchanged through fiber optic local loop distribution system 18 and telecommunications switch 16 to reach telecommunications network 12. Alternatively, optical network unit 20 may also include wireless telephone circuitry so that these local wireless telephony signals may be exchanged with wireless telephone provider 14. Wireless telephone provider 14 would then provide access to telecommunications network 12.

Figure 2:
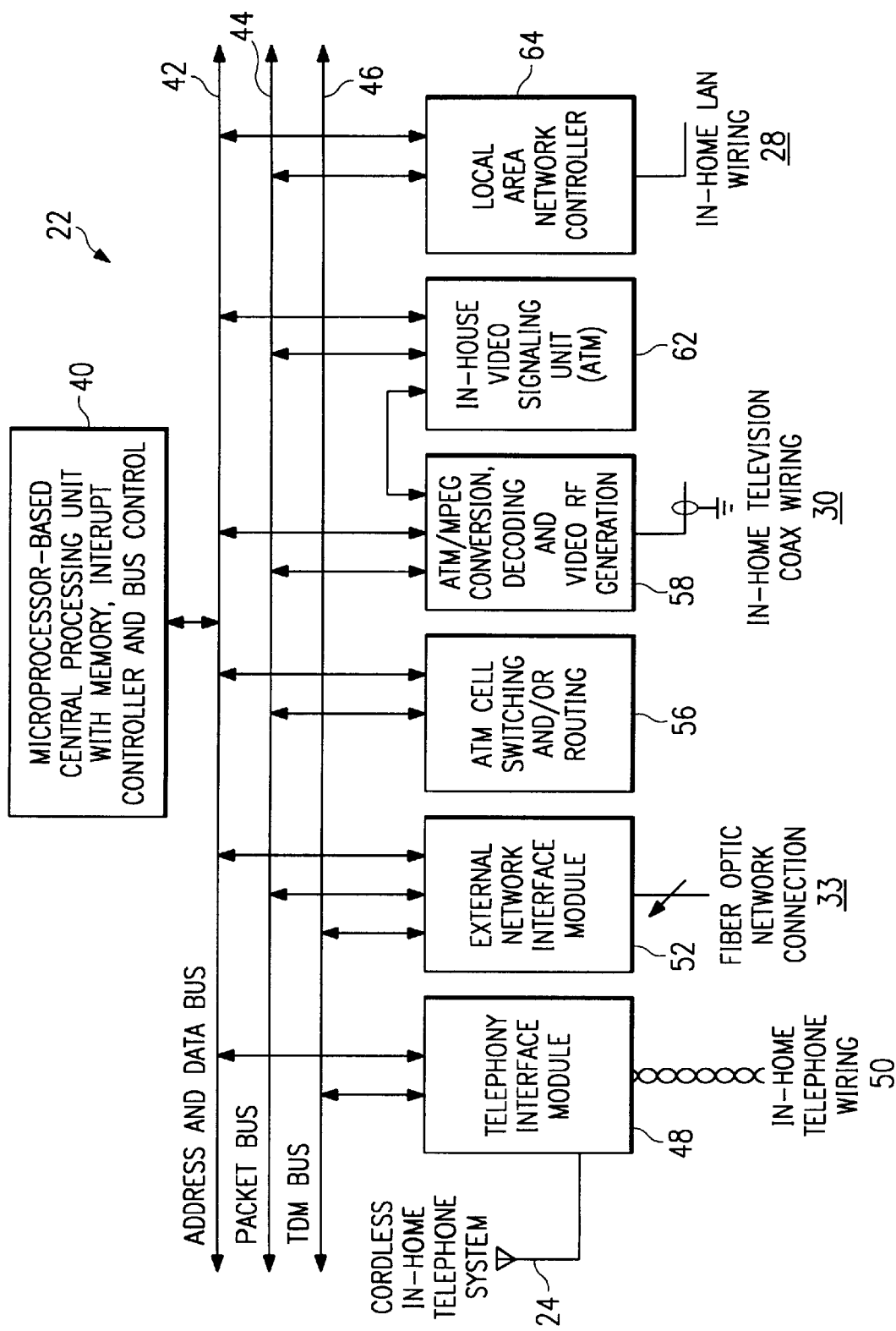
FIG. 2 is a block diagram illustrating a subscriber terminal of the telecommunications system and network.

FIG. 2 is a block diagram of subscriber terminal 22 of the telecommunications system. Subscriber terminal 22 includes microcontroller/microcomputer 40 for controlling an address and data bus 42, a packet bus 44, and a time division multiplexing (TDM) bus 46. Address and data bus 42, packet bus 44, and TDM bus 46 exchange signals with a variety of modules. The modules include a telephony interface module 48, an external network interface module 52, an asynchronous transfer mode (ATM) cell controller 56, an asynchronous transfer mode/motion picture experts group (ATM/MPEG) decoder 58, an in-house video signaling unit 62, and a local area network (LAN) controller 64.

External network interface module 52 interfaces with address and data bus 24, packet bus 44, and TDM bus 46. External network interface module 52 provides all of the incoming and outgoing optical communication signals and interfaces with a fiber optic connection 33. Fiber optic connection 33 exchanges optical communication signals including video, audio, data, and telephony signals between optical network unit 20 and subscriber terminal 22.

Telephony interface module 48 includes a subscriber terminal cordless telephone antenna 24, and interfaces with address and data bus 42 and TDM bus 46. Telephony interface module 48 also couples to in-home telephone wiring 50. Subscriber terminal cordless telephone antenna 24 provides local telephony communication with a cordless telephone such as cordless telephone handset 26 shown in FIG. 1.

ATM cell controller 56, ATM/MPEG decoder 58, and in-house video signaling unit 62 are used in subscriber terminal 22 to exchange video communication signals. ATM cell controller 56 and ATM/MPEG decoder 58 couple to address and data bus 42 and packet bus 44 of microcontroller/microcomputer 40. In-house video signaling unit 62 also couples to address data bus 42 and packet bus 44. ATM/MPEG decoder 58 is also in direct communication with in-house video signaling unit 62. ATM/MPEG decoder 58 is used to compress and decompress video communication signals and provide them to in-home television wiring 30. In-home television wiring 30 may include coaxial cable.

LAN controller 64 couples to address and data bus 42 and packet bus 44. LAN controller 64 exchanges data signals that are ultimately supplied to in-home LAN wiring 28 for use by personal computers that may be connected as a computer network.

In operation, external network interface module 52 receives a variety of optical communication signals including video, audio, data, and telephony signals. Telephony signals are then provided to the bus of microcontroller/microcomputer 40. Microcontroller/microcomputer 40 controls the exchange and flow of information throughout subscriber terminal 22. Microcontroller/microcomputer 40 provides and receives various control signals to address and data bus 42 to ensure that the various communication signals are properly routed throughout subscriber terminal 22. Telephony signals are provided to telephony interface module 48 through TDM bus 46. Telephony interface module 48 then provides the telephony signals to in-home telephone wiring 50 and to subscriber terminal cordless telephone antenna 24 so that telephony signals may be provided to a local cordless telephone. Telephony interface module 48 provides appropriate control signals to address and data bus 42 along with telephony signals to TDM bus 46 when telephony signals are being sent from subscriber terminal 22. These telephony signals are then provided to external network interface module 52 which in turn provides the signals to fiber optic connection 33.

Video communication signals are controlled and provided through the combination of ATM cell controller 56, ATM/MPEG decoder 58, and in-house video signaling unit 62. For example, the control of the exchange of video signals is provided by ATM cell controller 56 while ATM/MPEG decoder 58 receives the actual video signals from packet bus 44 and decodes or decompresses the video signals and provides it to in-home television wiring 30 which is coupled to various television receiving units. In-house video signaling unit 62 is used to provide control signals to ATM/MPEG code 58 and microcontroller/microcomputer 40 so that the desired video program may be received by subscriber terminal 22.

LAN controller 64 is used to exchange computer data signals between personal computers coupled to in-home LAN wiring 28 and external networks and computers coupled to a telecommunications system. The external network or computer accesses subscriber terminal 22 through telecommunications network 12 which in turn supplies the computer data to external network interface module 52 which when supplies the data to LAN controller 64.

Figure 3:
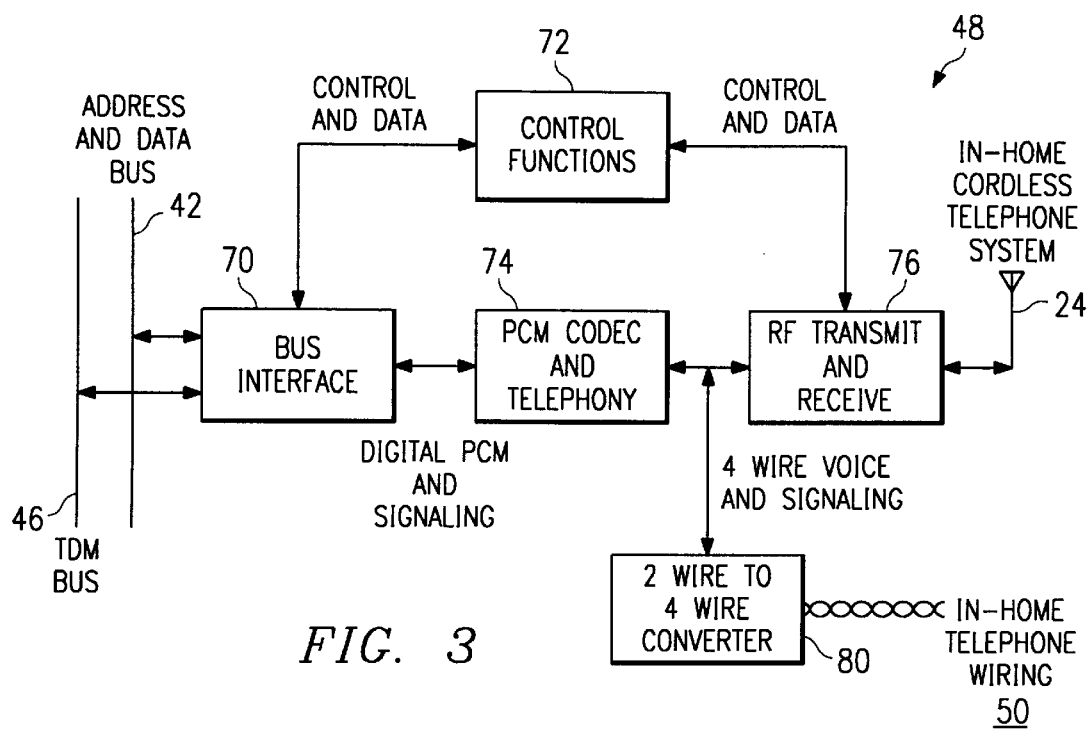
FIG. 3 is a block diagram illustrating a telephony interface module of the subscriber terminal.

FIG. 3 is a block diagram of telephony interface module 48. Telephony interface module 48 includes a bus interface 70, a pulse code modulation (PCM) codec 74, a transceiver 76, a subscriber terminal cordless telephone antenna 24, and a wire converter 80. Various control functions of telephony interface module 48 are performed by a control circuit 72. In operation, telephony signals are exchanged between TDM bus 46 and bus interface 70. Address and data bus 42 also couples to bus interface 70 to determine when bus interface 70 may receive or provide telephony signals to TDM bus 46. When receiving telephony signals, TDM bus 46 provides telephony signals to bus interface 70 which in turn provides the telephony signals to PCM codec 74. PCM codec 74 decodes and decompresses the digital telephony signal and provides a decoded telephony signal to wire converter 80 so that the telephony signal may be distributed throughout in-home telephone wiring 50. PCM codec 74 also provides decoded telephony signals to transceiver 76 so that they may be transmitted through subscriber terminal cordless telephone antenna 24 to a local cordless telephone.

When telephony interface module 48 supplies telephony signals, the telephony signals are received from either in-home telephone wiring 50 or through subscriber terminal cordless telephone antenna 24. The telephony signals are openly provided to bus interface 70 which in turn provides the telephony signals to TDM bus 46. Control circuit 72 is used throughout the operation of telephony interface module 48 to exchange various control and data signals.

Figure 4:
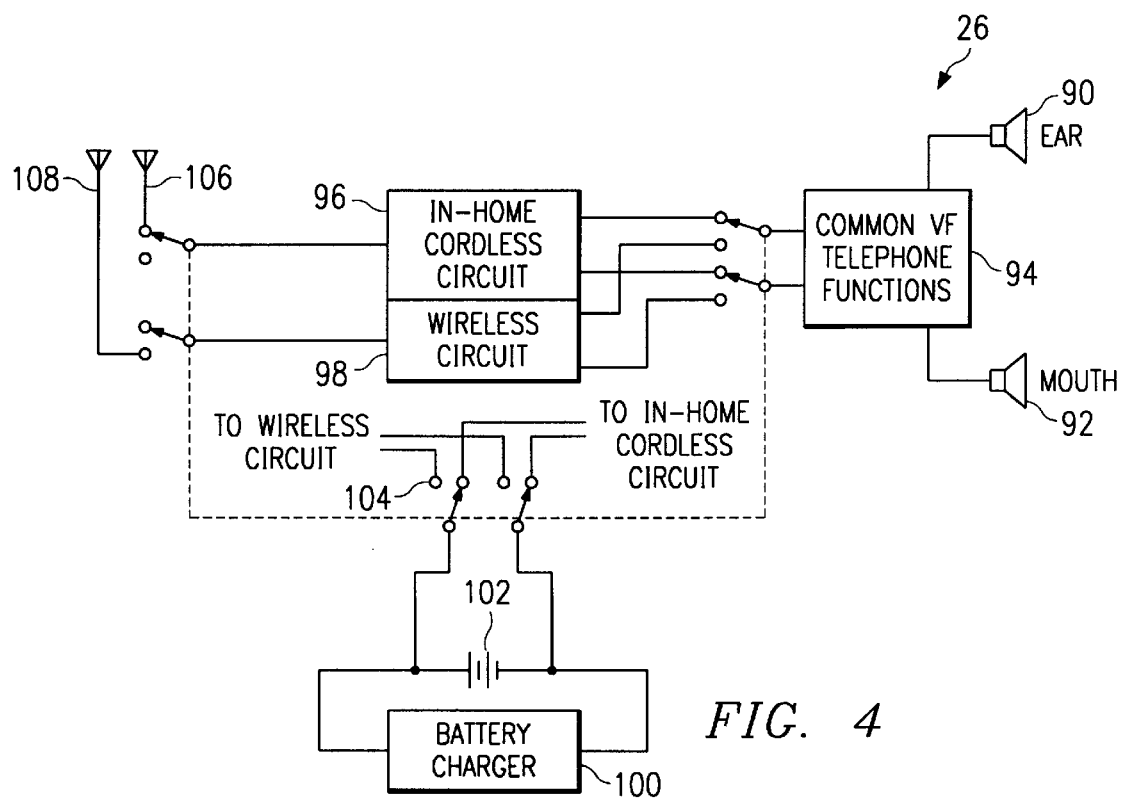
FIG. 4 is a block diagram illustrating a wireless telephone for use with the subscriber terminal.

FIG. 4 is a block diagram of cordless telephone handset 26. Cordless telephone handset 26 includes a speaker 90 and a microphone 92 which may be a standard telephone handset including a common telephone voice circuit 94. Cordless telephone handset 26 further includes an in-home cordless circuit 96, a wireless circuit 98, a battery charger 100, a circuit switch 104, a cordless telephone antenna 106, and a wireless telephone antenna 108. Cordless telephone handset 26 may operate as a local cordless phone for providing cordless telephone operation from within a home or as a wireless telephone providing wireless telephone access from either within the home or outside of the home.

Cordless telephone handset 26 normally operates as a cordless telephone when operated in and around the home or business. The telephony communication signals that are provided through cordless telephone antenna 106 are sent to a local terminal, such as subscriber terminal 22 shown in FIGS. 1 and 2, so that telephony signals may be exchanged through a fiber optic or copper wire-based local loop distribution system. The local loop distribution system in turn couples to a telecommunications network. However, when communication is no longer possible through a local loop distribution system, a cordless telephone handset 26 converts to wireless mode and telephony communication continues.

In operation, cordless telephone handset 26 is powered by a battery 102 that may be recharged by battery charger 100.

When operating in local cordless mode and telephony signals are being exchanged through a wired local loop distribution system, common telephone voice circuit 94 exchanges signals with in-home cordless circuit 96. Common telephone voice circuit 94 provides audio signals to speaker 90 and receives audio signals from microphone 92. In-home cordless circuit 96 exchanges signals with cordless telephone antenna 106 so that wireless telephony signals may be provided to a local subscriber terminal. Whenever a power outage occurs or a failure occurs in the local loop distribution system, telephony signals can no longer be exchanged through a wired local loop distribution system. Accordingly, cordless telephone handset 26 converts to wireless mode such that common telephone voice circuit 94 switches from in-home cordless circuit 96 to wireless circuit 98. Conversion to wireless operation may occur automatically through detection of a power loss or manually by a switch on cordless telephone handset 26. Telephony signals are then exchanged between common telephone voice circuit 94 and wireless circuit 98.

When this change occurs, circuitry switch 104 applies power from battery 102 to wireless circuit 98. Wireless circuit 98 provides telephony signals to wireless telephone antenna 108 so that wireless communication can occur between cordless telephone handset 26 and wireless telephone provider 14. In this manner, battery power is economically provided for wireless use than for providing back-up power for subscriber terminal 22 in the event of a power outage at business/residence 32. Alternative, instead of exchanging wireless telephony signals with a wireless communication system, wireless telephony signals may be exchanged with a satellite-based communication system.

In summary, a subscriber terminal having the capability to exchange telephony signals with a fiber optic based local loop distribution system and with a wireless communication system solves the operational problems associated with prior subscriber terminals interfaced to fiber optic local loop distribution systems when power outages occur. The present invention also provides advantages over the operation of subscriber terminals or phones coupled to traditional wire based local loop distribution systems, such as copper-wire local loop distribution systems, when the local loop system is interrupted, severed, or fails in some manner. Telephony communication can still be provided through a wireless communication system.

Thus, there has been provided, in accordance with the present invention, a subscriber terminal and method using a fiber optic based local loop that satisfies the advantages set forth above. Although the preferred embodiment has been described in detail, it should be understood that various changes, substitutions, and alterations can be made herein. For example, different types of wireless communication systems, such as satellite based communication systems, may be used to transfer telephony signals along with audio, video, and data communication signals. Other examples are readily ascertainable by one skilled in the art and may be made without departing from the spirit and scope of the present invention as defined by the following claims.

What is claimed is:

1. A subscriber terminal for a telecommunications network, comprising:
    a subscriber terminal having:
        an external network interface module operable to exchange information signals with the telecommunications network over a fiber optic connection from a fiber optic source, the information signals including telephony, video, and data;
        a telephony interface module operable to exchange telephony signals with the telecommunications network through the external network interface module, the telephony interface module operable to detect a loss of power to the fiber optic source during the fiber optic connection;
    a handset associated with the subscriber terminal for communicating telephony signals with the telecommunications network through the telephony interface module and the external network interface module, the handset functioning in a cordless mode for communicating with the telephony interface module during normal operation, the handset functioning in a wireless mode for communicating with the telecommunications network and bypassing the telephony interface module and the external network interface module in response to the loss of primary power to the fiber optic source.

2. The subscriber terminal of claim 1, wherein the telephony interface module and the external network interface module include a back-up power supply to provide power upon the loss of the primary power.

3. The subscriber terminal of claim 1, wherein the handset performs cellular communications with a cellular provider when operating in the wireless mode.

4. The subscriber terminal of claim 1, wherein the handset performs satellite communications with a satellite provider when operating in the wireless mode.

5. The subscriber interface of claim 1, wherein the handset performs personal communication service based communications when operating in the wireless mode.

6. The subscriber terminal of claim 1, wherein the handset automatically switches to the wireless mode upon detection of the loss of communications.

7. A method for providing telephony communications in the event of a loss of power to a subscriber terminal, comprising the steps of:
    establishing telephony communications through a fiber optic connection from a fiber optic source with the subscriber terminal;
    providing telephony communications between the subscriber terminal and a handset operating in a cordless mode;
    detecting a loss of power to the fiber optic source when the handset is within a cordless range of the fiber optic connection;
    placing the handset in a wireless mode in response to the loss of power; and providing telephony communications through a wireless communications system from the handset.

8. The method of claim 7, wherein the wireless communications system is a cellular communication system.

9. The method of claim 7, wherein the wireless communications system is a satellite communications system.

10. The method of claim 7, wherein the wireless communications system is a personal communication service based system.

11. The method of claim 7, further comprising the step of providing backup power to the subscriber terminal upon loss of the primary power.

12. The method of claim 7, further comprising the step of alerting an operator of the loss of communications to the subscriber terminal through the fiber optic connection.

13. A telecommunications system, comprising:
    a wireless communication system in communication with a telecommunications network and operable to receive and transmit over-the-air telephony signals;

a telecommunication switch operable to communicate telephony signals with the telecommunications network;

an optical network unit coupled to the telecommunications switch and operable to communicate telephony signals with the telecommunications switch;

a subscriber terminal operable to exchange telephony signals with the optical network unit through a fiber optic connection;

a handset operable to exchange telephony signals with the subscriber terminal in a cordless mode during normal operation, the handset operable to exchange telephony signals with the wireless communication system in a wireless mode upon a loss of power to the optical network unit driving the fiber optic connection when the handset is within a cordless range of the subscriber terminal.

14. The telecommunications system of claim 13, wherein the handset automatically switches to the wireless mode in response to the loss of power to the subscriber terminal or with optical network unit.

15. The telecommunications system of claim 13, wherein the subscriber terminal includes a backup power supply for supplying back-up power to the subscriber terminal upon the loss of power to the subscriber terminal.

16. The telecommunications system of claim 13, wherein the wireless communication system includes a cellular, satellite, or personal communication service based system.

17. The telecommunications system of claim 13, wherein the handset is operable to function as a cordless telephone for communicating directly to the optical network unit upon the occurrence of the communication failure through the fiber optic connection between the subscriber terminal and the optical network unit.

* * * * *